(12) United States Patent
Gallagher et al.

(10) Patent No.: US 10,233,868 B2
(45) Date of Patent: *Mar. 19, 2019

(54) EFFICIENT, LOW PRESSURE RATIO PROPULSOR FOR GAS TURBINE ENGINES

(71) Applicant: United Technologies Corporation, Farmington, CT (US)

(72) Inventors: Edward J. Gallagher, West Hartford, CT (US); Byron R. Monzon, Cromwell, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/252,811

(22) Filed: Aug. 31, 2016

(65) Prior Publication Data

US 2016/0377027 A1   Dec. 29, 2016

Related U.S. Application Data

(63) Continuation of application No. 13/176,365, filed on Jul. 5, 2011.

(51) Int. Cl.
| | |
|---|---|
| *F02K 3/06* | (2006.01) |
| *F01D 17/14* | (2006.01) |
| *F02K 1/06* | (2006.01) |

(52) U.S. Cl.
CPC ............... *F02K 3/06* (2013.01); *F01D 17/14* (2013.01); *F02K 1/06* (2013.01); *F05D 2220/327* (2013.01); *F05D 2260/4031* (2013.01)

(58) Field of Classification Search
CPC ... F02K 3/06; F02K 1/06; F01D 5/282; F01D 17/14; F05D 2260/4031; F05D 2220/327
See application file for complete search history.

(56) References Cited

U.S. PATENT DOCUMENTS

| | | |
|---|---|---|
| 3,287,906 A | 11/1966 | McCormick |
| 3,468,473 A | 9/1969 | Davies et al. |

(Continued)

FOREIGN PATENT DOCUMENTS

| | | |
|---|---|---|
| EP | 1712738 | 10/2006 |
| GB | 1516041 | 6/1978 |

(Continued)

OTHER PUBLICATIONS

Edkins, D.P. and Hirschkron, R.L. (1972). TF34 turbofan quiet engine study final report. NASA CR-120914. Dec. 31, 1972. pp. 1-96.

(Continued)

*Primary Examiner* — Carlos A Rivera
(74) *Attorney, Agent, or Firm* — Carlson, Gaskey & Olds, P.C.

(57) ABSTRACT

A gas turbine engine includes a gear assembly, a bypass flow passage, and a core flow passage. The bypass flow passage includes an inlet. A fan is arranged at the inlet of the bypass flow passage. A first shaft and a second shaft are mounted for rotation about an engine central longitudinal axis. A first turbine is coupled with the first shaft such that rotation of the first turbine is configured to drive the fan, through the first shaft and gear assembly, at a lower speed than the first shaft. The fan includes a hub and a row of fan blades that extend from the hub. The row includes 12 (N) of the fan blades, a solidity value (R) that is from 1.0 to 1.2, and a ratio of N/R that is from 10.0 to 12.0.

28 Claims, 2 Drawing Sheets

(56) References Cited

U.S. PATENT DOCUMENTS

| | | | |
|---|---|---|---|
| 3,747,343 A | 7/1973 | Rosen | |
| 3,754,484 A | 8/1973 | Roberts | |
| 3,892,358 A | 7/1975 | Gisslen | |
| 4,130,872 A | 12/1978 | Haloff | |
| 4,486,146 A | 12/1984 | Campion | |
| 4,885,912 A * | 12/1989 | Nakhamkin | F02C 1/06 60/652 |
| 5,141,400 A | 8/1992 | Murphy et al. | |
| 5,169,288 A | 12/1992 | Gliebe et al. | |
| 5,433,674 A | 7/1995 | Sheridan et al. | |
| 5,447,411 A | 9/1995 | Curley et al. | |
| 5,524,847 A | 6/1996 | Brodell et al. | |
| 5,769,607 A | 6/1998 | Neely et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 6,004,095 A | 12/1999 | Waitz et al. | |
| 6,195,983 B1 | 3/2001 | Wadia et al. | |
| 6,223,616 B1 | 5/2001 | Sheridan | |
| 6,318,070 B1 | 11/2001 | Rey et al. | |
| 6,709,239 B2 | 3/2004 | Chandraker | |
| 6,814,541 B2 | 11/2004 | Evans et al. | |
| 7,021,042 B2 | 4/2006 | Law | |
| 7,107,756 B2 | 9/2006 | Rolt | |
| 7,374,403 B2 * | 5/2008 | Decker | F01D 5/141 416/223 A |
| 7,591,754 B2 | 9/2009 | Duong et al. | |
| 7,758,306 B2 | 7/2010 | Burton et al. | |
| 7,770,377 B2 | 8/2010 | Rolt | |
| 7,824,305 B2 | 11/2010 | Duong et al. | |
| 7,882,691 B2 | 2/2011 | Lemmers, Jr. et al. | |
| 7,926,260 B2 | 4/2011 | Sheridan et al. | |
| 7,950,237 B2 | 5/2011 | Grabowski et al. | |
| 8,205,432 B2 | 6/2012 | Sheridan | |
| 8,667,775 B1 | 3/2014 | Kisska et al. | |
| 8,951,632 B2 | 2/2015 | Shah et al. | |
| 9,121,412 B2 | 9/2015 | Gallagher et al. | |
| 2006/0228206 A1 | 10/2006 | Decker et al. | |
| 2007/0151258 A1 * | 7/2007 | Gaines | F02C 7/36 60/792 |
| 2008/0095633 A1 | 4/2008 | Wilson | |
| 2008/0155961 A1 | 7/2008 | Johnson | |
| 2008/0206048 A1 | 8/2008 | Coupe et al. | |
| 2008/0226454 A1 | 9/2008 | Decker et al. | |
| 2009/0074565 A1 | 3/2009 | Suciu et al. | |
| 2009/0245997 A1 * | 10/2009 | Hurwitz | F01D 17/08 415/1 |
| 2010/0089019 A1 | 4/2010 | Knight et al. | |
| 2010/0148396 A1 | 6/2010 | Xie et al. | |
| 2010/0162683 A1 | 7/2010 | Grabowski et al. | |
| 2010/0218483 A1 | 9/2010 | Smith | |
| 2010/0260609 A1 | 10/2010 | Wood et al. | |
| 2010/0331139 A1 | 12/2010 | McCune | |
| 2013/0008146 A1 | 1/2013 | Gallagher et al. | |

FOREIGN PATENT DOCUMENTS

| | | |
|---|---|---|
| GB | 2041090 | 9/1980 |
| GB | 2426792 | 12/2006 |
| WO | 2007038674 | 4/2007 |
| WO | 2015034630 | 3/2015 |
| WO | 2015047511 | 4/2015 |

OTHER PUBLICATIONS

Marsh, G. (2012). Aero engines lose weight thanks to composites. Reinforced Plastics. 56(6). Nov. 1, 2012. pp. 32-35.

European Search Report for European Patent Application No. 16166928 dated Sep. 7, 2016.

European Search Report for European Patent Application No. 12174431 dated Sep. 8, 2016.

McMillian, K (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modem Machine Shop. Retrieved from: http://www.mmsonline.com/articles/composite-fan-blade-containment-case pp. 1-4.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau K Gu, C. and Hui, D. (2005). A critical review on nanotube and nanotube/nanoclay related polymer composite materials. Composites: Part B 37(2006) 425-436.

Shorter Oxford English dictionary, fith Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

(56) References Cited

OTHER PUBLICATIONS

Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Hughes, C. (2010). Geared turbofan technology. NASA Environmentally Responsible Aviation Project. Green Aviation Summit. NASA Ames Research Center. Sep. 8-9, 2010. pp. 1-8.
Moxon, J. How to save fuel in tomorrow's engines. Flight International. Jul. 30, 1983. 3873(124). pp. 272-273.
File History for U.S. Appl. No. 12/131,876.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Zalud, T. (1998). Gears put a new spin on turbofan performance. Machine Design, 70(20), p. 104.
Ivchenko-Progress D-436. Jane's Aero-engines, Aero-engines—Turbofan. Feb. 8, 2012.
Ivchenko-Progress Al-727M. Jane's Aero-engines, Aero-engines-Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, Dr. (2011). Refined exploration of turbofan design options for an advanced single-aisle transport. NASA/TM-2011-216883. pp. 1-27.
File History for U.S. Pat. No. 9,121,412.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Willis, W.S. (1979). Quiet clean short-haul experimental engine final report. Prepared for NASA. Aug. 1979. pp. 1-293.
Sweetman, B. and Sutton, O. (1998). Pratt & Whitney's surprise leap: The announcement of the PW8000 geared turbofan caught the industry unawares. Interavia. Jun. 1998; 53, 621. pp. 25-26.
Brines, G. (1990). The turbofan of tomorrow. Mechanical Engineering; The Journal of the American Society of Mechanical Engineers. 112, 8. pp. 65-67.
Mattingly, J.D. (1996). Elements of gas turbine propulsion. McGraw-Hill. New York, NY. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, 923-925.
Gunston, B. (2000). Ed. Jane's aero-engines. Issue Seven. Janes Information Group Limited. Alexandria, VA. pp. 510-512.
Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.
Whitaker, R. (1982). ALF502: plugging the turbofan gap. Flight International, Jan. 30, 1982. p. 237-241.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Petition for Inter Partes Review of U.S. Pat. No. 9,121,412.
Declaration of Reza Abhari, Ph.D. In re U.S. Pat. No. 9,121,412. Executed Apr. 23, 2016. pp. 1-71.
Gray, D.E. et al. (1978). Energy efficient engine preliminary design and integration study. United Technologies corporation; Pratt & Whitney Aircraft Group. Prepared for NASA. Nov. 1, 1978. pp. 1-366.
Meier, N. (2005). Civil Turbojet/Turbofan Specifications. Retrieved from http://www.jet-engine.net/civtfspec.html.
Thompson, L. (2016). Gamechanger: How Pratt & Whitney transformed itself to lead a revolution in jet propulsion. Forbes. Retrieved Apr. 28, 2016 from: http://www.forbes.com/sites/lorenthompson/2016/01/21/gamechanger-how-pratt-whitney-transformed-itself-to-lead-a-revolu ion-in-jet-propulsion/print/.
Grose, T.K. (2013). Reshaping flight for fuel efficiency: Five technologies on the runway. National Geographic. Retrieved Mar. 16, 2016 from: http://news.nationalgeographic.com/news/energy/2013/041130423-reshaping-flight-for-fuel-efficiency.html.
Krauskopf, L. & Shumaker, L. (2014). GE exec says avoided geared design in jet engine battle with Pratt. Reuters. Sep. 15, 2014. http://www.reuters.com/article/us-general-electric-united-tech-engine-idUSKBN0HA2H620140915.
Tsang, D. (2011). Special report: The engine battle heats up (Update 1). Aspire Aviation. Retrieved Apr. 3, 2016 from: http://www.aspireaviation.com/2011/05/10/pw-purepower-engine-vs-cfm-leap-x/.
Gates, D. (Jul. 13, 2008). Bombardier flies at higher market. The Seattle Times, pp. C6.
Dixon, S.L. (1998). Fluid mechanics, thermodynamics of turbomachinery. Oxford: Elsevier Butterworth—Heinemann. pp. 94-144.
Epstein, A.H. (2014). Aeropropulsion for commercial aviation in the twenty-first century and research directions needed. AiAA Journal 52(5). May 2014. pp. 901-911.
Gliebe P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Hall, C.A. and Crichton, D. (2007). Engine design studies for a silent aircraft. Journal of Turbomachinery, 129, 479-487.
Mattingly, J.D. (1996). Elements of gas turbine propulsion. New York, New York: McGraw-Hill, Inc. pp. 299-305.
Deposition Transcript of Reza Abhari, Ph.D. *General Electric Company*, Petitions vs. *United Technologies Corporation*, Patent Owner. IPR2016-00952. pp. 1-224.
Pratt & Whitney (2014). Evaluation of ARA catalytic hydrothermolysis (CH) fuel: Continuous lower energy, emissions and noise (CLEEN) program. FR-27652-2 Rev. 1. Apr. 30, 2014. pp. 1-17.
Declaration of Dr. K Mathioudakis. In re U.S. Pat. No. 9,121,412. Executed Jan. 27, 2017. pp. 1-65.

(56) References Cited

OTHER PUBLICATIONS

Benzakein, M.J. (2001). Propulsion strategy for the 21st century—A vision into the future. pp. 1-9.
Mattingly, J.D. (2006). Elements of propulsion gas turbines and rockets. . New York, New York: AAIA Education Series. p. 419.
Horlock, J.H. (1958). Axial flow compressors: Fluid mechanics and thermodynamics. London: Butterworths Scientific Publications. pp. 29, 70.
NASA (1965). Aerodynamic design of axial-flow compressors. pp. 1-505.
Flack, R. (2005). Fundamentals of jet propulsion with applications. New York: Cambridge University Press. p. 281.
Guynn, M.D., Berton, J.J., Fisher, K, Haller, W.J., Tong, M.T. & Thurman, D.R. (2009). Analysis of turbofan design options for an advanced sing-aisle transport aircraft. AAIA 2009-6942. Sep. 21-23, 2009. p, 1-13.
Xu, L. & Gronstedt, T. (2010). Design analysis of an intercooled turbofan engine. Journal of Engineering for Gas Turbine Engines and Power vol. 132. Nov. 2010. pp. 114503-1-114503-4.
Kerrebrock, J.L. (1992). Aircraft engines and gas turbines. Cambridge, Massachusetts: The MIT Press. p. 74-5, 123.
Hill, P.G. & Peterson, C.R. (2010). Mechanics and thermodynamics of propulsion, 2nd Edition. New Delhi, India: Darling Kindersley. p. 225-6.
Guynn, M.D., Berton, J.J. & Haller, W.J. (2013). Advanced single-aisle transport propulsion design options revisited. AIAA 2013-4330. Aug. 12-14, 2013. p. 1-17.
Patent Owner's Response. *General Electric Company*, Petition, v. *United Technologies Corporation*, Patent Owner. U.S. Pat. No. 9,121,412. IPR2016-00952. Filed Jan. 27, 2017. p. 1-75.
Decision for Inter Partes Review of U.S. Pat. No. 9,121,412. Claims 1, 2, 4, 5, 7, 8, and 11. *General Electric company*, Petitioner v. *United Technologies Corporation*, Patent Owner. Entered date of Oct. 27, 2016.
Whitaker, R. (1982). ALF 502: plugging the turbofan gap. Flight International, p. 237-241, Jan. 30, 1982.
Munt, R. (1981). Aircraft technology assessment: Progress in low emissions engine. Technical Report. May 1981. pp. 1-171.
Waters, M.H. and Schairer, E.T. (1977). Analysis of turbofan propulsion system weight and dimensions. NASA Technical Memorandum. Jan. 1977. pp. 1-65.
Avco Lycoming Divison. ALF 502L Maintenance Manual. Apr. 1981. pp. 1-118.
Type Certificate Data Sheet No. E6NE. Department of Transportation Federal Aviation Administration. Jun. 7, 2002. pp. 1-10.
Trembley, Jr., H.F. (1977). Determination of effects of ambient conditions on aircraft engine emissions. Prepared for Environmental Protection Agency. Ann Arbor, Michigan. Sep. 1977 pp. 1-256.
Honeywell LF502. Jane's Aero-engines, Aero-engines—Turbofan. Feb. 9, 2012.
Honeywell LF502. Jane's Aero-engines, Aero-engines—Turbofan. Aug. 17, 2016.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Rauch, D. (1972). Design study of an air pump and integral lift engine ALF-504 using the Lycoming 502 core. Prepare for NASA. Jul. 1972. pp. 1-182.
Dassault Falcon 900EX Easy Systems Summary. Retrieved from: http://www.smartcockpit.com/docs/F900EX-Engines.pdf pp. 1-31.
Honeywell TFE731 Pilot Tips. pp. 1-143.
Honeywell TFE731-5AR to -5BR Engine Conversion Program. Sep. 2005. pp. 1-4.
Garret TFE731 Turbofan Engine (CAT C). Chapter 79: Lubrciation System. TTFE731 Issue 2. 2010. pp. 1-24.
McArdle, J.G. (1979). Static test-stand performance of the YF-102 turbofan engine with several exhaust configurations for the quiet short-haul research aircraft (QSRA). Nasa Technical Paper. Nov. 1979. pp. 1-68.
Petition for Inter Partes Review of U.S. Pat. No. 9,121,368. *General Electric Company, Petitioner*, v. *United Technologies Corporation*, Patent Owner. IPR2018-01123. filed May 18, 2018.
Declaration of Magdy Attia. In re U.S. Pat. No. 9,121,368. IPR2018-01123. Executed May 17, 2018. pp. 1-89.
McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.
Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
Datasheet. CF6-80C2 high-bypass turbofan engines. Retrieved from https://geaviation.com/sites/default/files/datasheet-CF6-80C2.pdf.
Salemme, C.T. and Murphy, G.C. (1979). Metal spar/superhybrid shell composite fan blades. Prepared for NASA. NASA-CR-159594. Aug. 1979. pp. 1-127.
Press release. The GE90 engine. Retrieved from: https://www.geaviation.com/commerical/engines/ge90-engine; https://www.geaviation.com/press-release/ge90-engine-famile/ge90-115b-fan-completing-blade-testing-schedule-first-engine-test; and https://www.geaviation.com/press-release/ge90-engine-family/ge'scomposite-fan-blade-revolution-turns-20-years-old.
Datasheet. Genx™ high bypass turbofan engines. Retrieved from: https://www.geaviation.com/sites/default/files/datasheet-genx.pdf.
Winn, A. (Ed). (1990). Wide Chord Fan Club. Flight International, 4217(137). May 23-29, 1990. pp. 34-38.
Decision Denying Institution of Inter Partes Review. *General Electric Company, Petitioner* v. *United Technologies Corporation*, Patent Owner. IPR2018-01123. U.S. Pat. No. 9,121,368. Entered Nov. 29, 2018. pp. 1-25.

\* cited by examiner

EFFICIENT, LOW PRESSURE RATIO PROPULSOR FOR GAS TURBINE ENGINES

CROSS REFERENCE TO RELATED APPLICATIONS

The present disclosure is a continuation of U.S. application Ser. No. 13/176,365, filed Jul. 5, 2011.

STATEMENT REGARDING FEDERALLY SPONSORED RESEARCH OR DEVELOPMENT

This invention was made with government support under contract number NAS3-01138 awarded by NASA. The government has certain rights in the invention.

BACKGROUND

This disclosure relates to gas turbine engines and, more particularly, to an engine having a geared turbo fan architecture that is designed to efficiently operate with a high bypass ratio and a low pressure ratio.

The propulsive efficiency of a gas turbine engine depends on many different factors, such as the design of the engine and the resulting performance debits on the fan that propels the engine. As an example, the fan rotates at a high rate of speed such that air passes over the blades at transonic or supersonic speeds. The fast-moving air creates flow discontinuities or shocks that result in irreversible propulsive losses. Additionally, physical interaction between the fan and the air causes downstream turbulence and further losses. Although some basic principles behind such losses are understood, identifying and changing appropriate design factors to reduce such losses for a given engine architecture has proven to be a complex and elusive task.

SUMMARY

An exemplary gas turbine engine includes a spool, a turbine coupled to drive the spool, and a propulsor that is coupled to be driven by the turbine through the spool. A gear assembly is coupled between the propulsor and the spool such that rotation of the turbine drives the propulsor at a different speed than the spool. The propulsor includes a hub and a row of propulsor blades that extend from the hub. The row includes no more than 20 of the propulsor blades.

In another aspect, a gas turbine engine includes a core flow passage and a bypass flow passage. A propulsor is arranged at an inlet of the bypass flow passage and core flow passage. The propulsor includes a hub and a row of propulsor blades that extend from the hub. The row includes no more than 20 of the propulsor blades and the bypass flow passage has a design pressure ratio of approximately 1.3-1.55 with regard to an inlet pressure and an outlet pressure of the bypass flow passage.

An exemplary propulsor for use in a gas turbine engine includes a rotor having a row of propulsor blades that extends radially outwardly from a hub. Each of the propulsor blades extends radially between a root and a tip and in a chord direction between a leading edge and a trailing edge to define a chord dimension at the tip of each propulsor blade. The row of propulsor blades defines a circumferential pitch with regard to the tips. The row of propulsor blades has a solidity value defined as the chord dimension divided by the circumferential pitch. The row also includes a number of the propulsor blades that is no greater than 20 such that a ratio of the number of propulsor blades to the solidity value is from 9 to 20.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
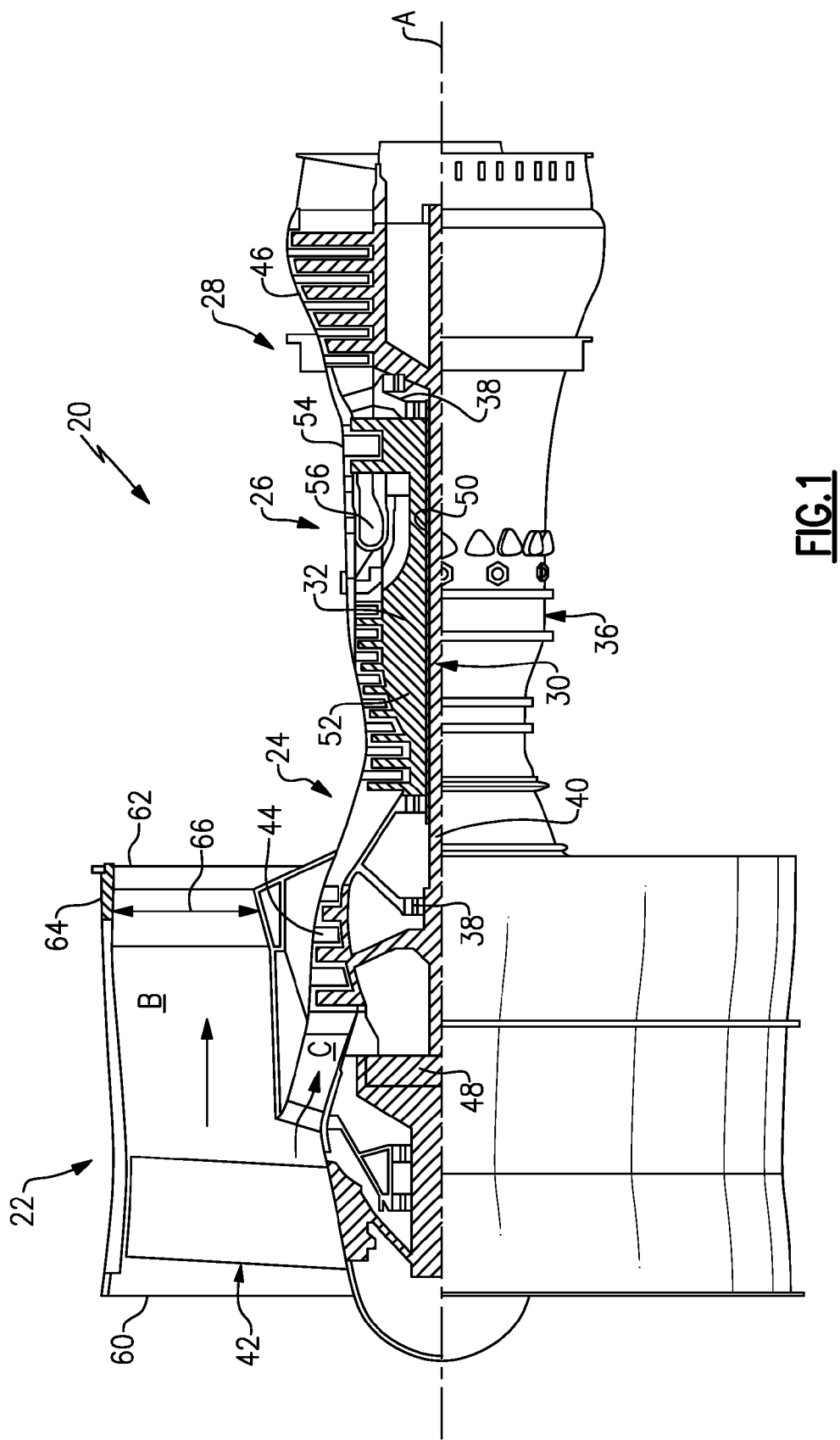
FIG. 1 is a schematic cross-section of a gas turbine engine.

FIG. 1 schematically illustrates a gas turbine engine 20. The gas turbine engine 20 may be a two-spool turbofan that generally incorporates a fan section 22, a compressor section 24, a combustor section 26 and a turbine section 28. Alternative engine architectures may include a single-spool design, a three-spool design, or an open rotor design, among other systems or features.

The fan section 22 drives air along a bypass flow passage B while the compressor section 24 drives air along a core flow passage C for compression and communication into the combustor section 26. Although depicted as a turbofan gas turbine engine, it is to be understood that the concepts described herein are not limited to use with turbofans and the teachings may be applied to other types of gas turbine engines.

The engine 20 includes a low speed spool 30 and high speed spool 32 mounted for rotation about an engine central longitudinal axis A relative to an engine static structure 36 via several bearing systems 38. The low speed spool 30 generally includes an inner shaft 40 that is coupled with a propulsor 42, a low pressure compressor 44 and a low pressure turbine 46. The low pressure turbine 46 drives the propulsor 42 through the inner shaft 40 and a gear assembly 48, which allows the low speed spool 30 to drive the propulsor 42 at a different (e.g. lower) angular speed.

The high speed spool 32 includes an outer shaft 50 that is coupled with a high pressure compressor 52 and a high pressure turbine 54. A combustor 56 is arranged between the high pressure compressor 52 and the high pressure turbine 54. The inner shaft 40 and the outer shaft 50 are concentric and rotate about the engine central longitudinal axis A, which is collinear with their longitudinal axes.

A core airflow in core flow passage C is compressed by the low pressure compressor 44 then the high pressure compressor 52, mixed with the fuel in the combustor 56, and then expanded over the high pressure turbine 54 and low pressure turbine 46. The turbines 54, 46 rotationally drive the respective low speed spool 30 and high speed spool 32 in response to the expansion.

As shown, the propulsor 42 is arranged at an inlet 60 of the bypass flow passage B and core flow passage C. Air flow through the bypass flow passage B exits the engine 20 through an outlet 62 or nozzle. For a given design of the propulsor 42, the inlet 60 and the outlet 62 of the engine 20 define a design pressure ratio with regard to an inlet pressure at the inlet 60 and an outlet pressure at the outlet 62 of the bypass flow passage B. As an example, the design pressure ratio may be determined based upon the stagnation inlet pressure and the stagnation outlet pressure at a design rotational speed of the engine 20. In that regard, the engine 20 may optionally include a variable area nozzle 64 within the bypass flow passage B. The variable area nozzle 64 is operative to change a cross-sectional area 66 of the outlet 62 to thereby control the pressure ratio via changing pressure within the bypass flow passage B. The design pressure ratio may be defined with the variable area nozzle 64 fully open or fully closed.

Figure 2:
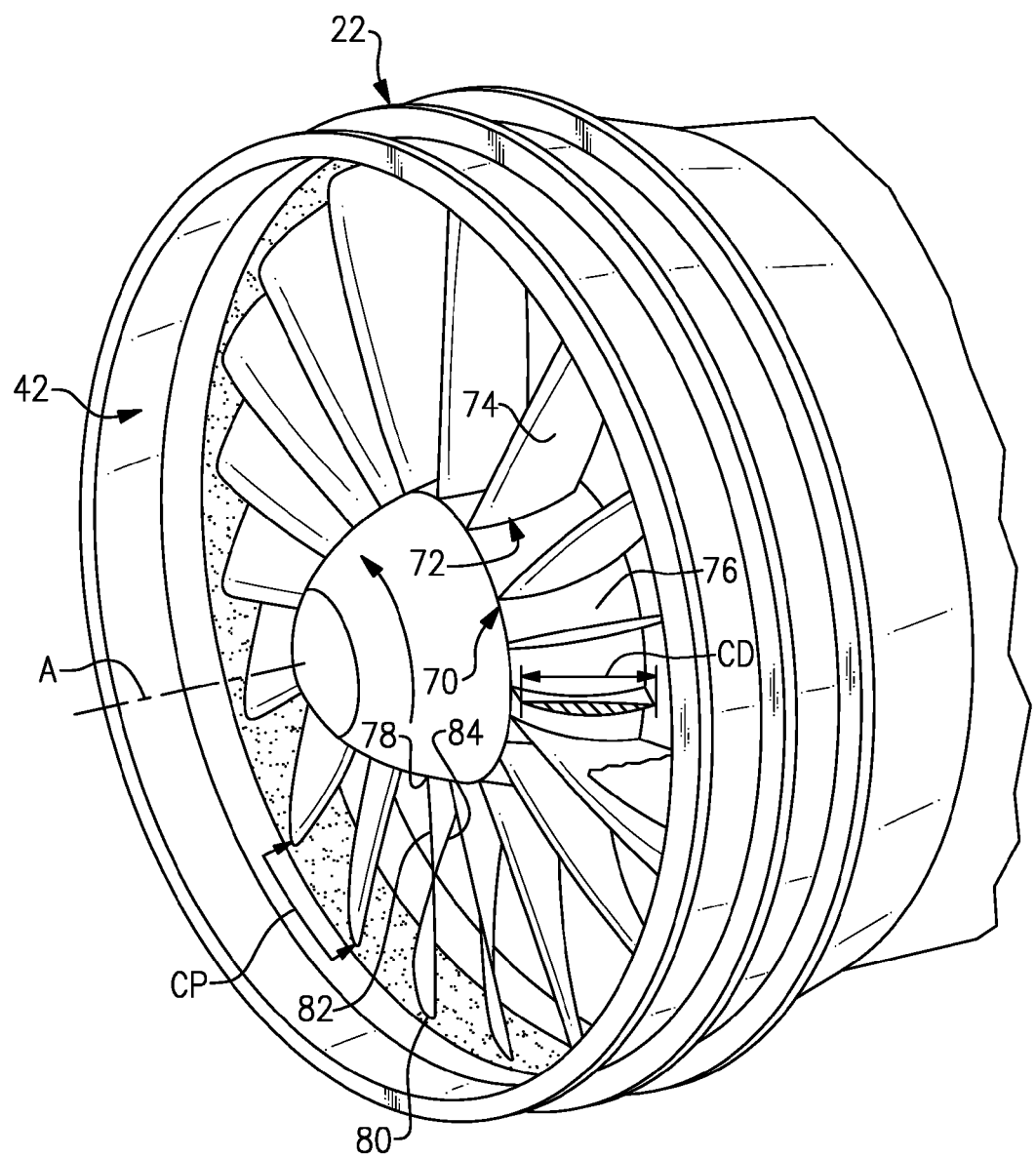
FIG. 2 is a perspective view of a fan section of the engine of FIG. 1.

Referring to FIG. 2, the propulsor 42, which in this example is a fan, includes a rotor 70 having a row 72 of propulsor blades 74 that extend a circumferentially around a hub 76. Each of the propulsor blades 74 extends radially outwardly from the hub 76 between a root 78 and a tip 80 and in a chord direction (axially and circumferentially) between a leading edge 82 and a trailing edge 84. A chord dimension (CD) is a length between the leading edge 82 and the trailing edge 84 at the tip of each propulsor blade 74. The row 72 of propulsor blades 74 also defines a circumferential pitch (CP) that is equivalent to the arc distance between the tips 80 of neighboring propulsor blades 74.

As will be described, the example propulsor 42 includes a number (N) of the propulsor blades 74 and a geometry that, in combination with the architecture of the engine 20, provides enhanced propulsive efficiency by reducing performance debits of the propulsor 42.

In the illustrated example, the number N of propulsor blades in the row 72 is no more than 20. In one example, the propulsor 42 includes 18 of the propulsor blades 74 uniformly circumferentially arranged about the hub 76. In other embodiments, the number N may be any number of blades from 12-20.

The propulsor blades 74 define a solidity value with regard to the chord dimension CD and the circumferential pitch CP. The solidity value is defined as a ratio (R) of CD/CP (i.e., CD divided by CP). In embodiments, the solidity value of the propulsor 42 is between 1.0 and 1.3. In further embodiments, the solidity value is from 1.1 to 1.2.

Additionally, in combination with the given example solidity values, the engine 20 may be designed with a particular design pressure ratio. In embodiments, the design pressure ratio may be between 1.3 and 1.55. In a further embodiment, the design pressure ratio may be between 1.3 and 1.4.

The engine 20 may also be designed with a particular bypass ratio with regard to the amount of air that passes through the bypass flow passage B and the amount of air that passes through the core flow passage C. As an example, the design bypass ratio of the engine 20 may nominally be 12, or alternatively in a range of approximately 8.5 to 13.5.

The propulsor 42 also defines a ratio of N/R. In embodiments, the ratio N/R is from 9 to 20. In further embodiments, the ratio N/R is from 14 to 16. The table below shows additional examples of solidity and the ratio N/R for different numbers of propulsor blades 74.

TABLE

| Number of Blades, Solidity and Ratio N/R | | |
|---|---|---|
| Number of Blades (N) | Solidity | Ratio N/R |
| 20 | 1.3 | 15.4 |
| 18 | 1.3 | 13.8 |
| 16 | 1.3 | 12.3 |
| 14 | 1.3 | 10.8 |
| 12 | 1.3 | 9.2 |
| 20 | 1.2 | 16.7 |
| 18 | 1.2 | 15.0 |
| 16 | 1.2 | 13.3 |
| 14 | 1.2 | 11.7 |
| 12 | 1.2 | 10.0 |
| 20 | 1.1 | 18.2 |
| 18 | 1.1 | 16.4 |
| 16 | 1.1 | 14.5 |
| 14 | 1.1 | 12.7 |
| 12 | 1.1 | 10.9 |
| 20 | 1.0 | 20.0 |
| 18 | 1.0 | 18.0 |
| 16 | 1.0 | 16.0 |
| 14 | 1.0 | 14.0 |
| 12 | 1.0 | 12.0 |

The disclosed ratios of N/R enhance the propulsive efficiency of the disclosed engine 20. For instance, the disclosed ratios of N/R are designed for the geared turbo fan architecture of the engine 20 that utilizes the gear assembly 48. That is, the gear assembly 48 allows the propulsor 42 to rotate at a different, lower speed than the low speed spool 30. In combination with the variable area nozzle 64, the propulsor 42 can be designed with a large diameter and rotate at a relatively slow speed with regard to the low speed spool 30. A relatively low speed, relatively large diameter, and the geometry that permits the disclosed ratios of N/R contribute to the reduction of performance debits, such as by lowering the speed of the air or fluid that passes over the propulsor blades 74.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
a gear assembly;
a bypass flow passage and a core flow passage, the bypass flow passage including an inlet;
a fan arranged within the bypass flow passage;
a first shaft and a second shaft;
a first turbine coupled with the first shaft, the first shaft coupled through the gear assembly with the fan;
wherein the fan includes a hub and a row of fan blades that extend from the hub, and the row includes a number (N) of the fan blades, the number (N) being 12, a solidity value (R) at tips of the fan blades that is from 1.0 to 1.2, and a ratio of N/R that is from 10.0 to 12.0.

2. The gas turbine engine as recited in claim 1, further comprising a second turbine coupled with the second shaft, wherein the second turbine is a 2-stage turbine.

3. The gas turbine engine as recited in claim 1, wherein the bypass flow passage includes an outlet, the inlet and the outlet defining a design pressure ratio with regard to an inlet pressure at the inlet and an outlet pressure at the outlet at a design rotational speed of the engine, the design pressure ratio being approximately 1.3 to 1.55.

4. The gas turbine engine as recited in claim 3, wherein the design pressure ratio is between 1.3 and 1.4.

5. The gas turbine engine as recited in claim 4, further comprising a second turbine coupled with the second shaft, wherein the second turbine is a 2-stage turbine.

6. The gas turbine engine as recited in claim 5, wherein the ratio of N/R is from 10.9 to 12.0.

7. The gas turbine engine as recited in claim 1, wherein the ratio of N/R is from 10.9 to 12.0.

8. The gas turbine engine as recited in claim 7, further comprising a second turbine coupled with the second shaft, wherein the second turbine is a 2-stage turbine.

9. The gas turbine engine as recited in claim 8, wherein the bypass flow passage includes an outlet, the inlet and the outlet defining a design pressure ratio with regard to an inlet pressure at the inlet and an outlet pressure at the outlet at a design rotational speed of the engine, the design pressure ratio being approximately 1.3 to 1.55.

10. The gas turbine engine as recited in claim 9, wherein the design pressure ratio is between 1.3 and 1.4.

11. A gas turbine engine comprising:
a gear assembly;
a bypass flow passage and a core flow passage, the bypass flow passage including an inlet an an outlet, the inlet and the outlet defining a design pressure ratio with regard to an inlet pressure at the inlet and an outlet pressure at the outlet at a design rotational speed of the engine, the design pressure ratio being approximately 1.3 to 1.4;
a fan arranged within the bypass flow passage;
a first shaft and a second shaft;
a first turbine coupled with the first shaft, the first shaft coupled through the gear assembly with the fan;
wherein the fan includes a hub and a row of fan blades that extend from the hub, and the row includes a number (N) of the fan blades, the number (N) being 16, a solidity value (R) at tips of the fan blades that is from 1.0 to 1.2, and a ratio of N/R that is from 13.3 to 16.0.

12. The gas turbine engine as recited in claim 11, further comprising a second turbine coupled with the second shaft, wherein the second turbine is a 2-stage turbine.

13. The gas turbine engine as recited in claim 12, further comprising a first compressor coupled with the first shaft, wherein the first compressor is a 3-stage compressor.

14. The gas turbine engine as recited in claim 11, further comprising a second turbine coupled with the second shaft, wherein the second turbine is a 2-stage turbine.

15. The gas turbine engine as recited in claim 14, wherein the ratio of N/R is from 14.5 to 16.0.

16. The gas turbine engine as recited in claim 11, wherein the ratio of N/R is from 14.5 to 16.0.

17. The gas turbine engine as recited in claim 16, wherein the solidity value (R) at the tips of the fan blades is from 1.0 to 1.1.

18. The gas turbine engine as recited in claim 17, further comprising a second turbine coupled with the second shaft, wherein the second turbine is a 2-stage turbine.

19. A gas turbine engine comprising:
a gear assembly;
a bypass flow passage and a core flow passage, the bypass flow passage including an inlet;
a fan arranged within the bypass flow passage;
a first shaft and a second shaft;
a first turbine coupled with the first shaft, the first shaft coupled through the gear assembly with the fan;
wherein the fan includes a hub and a row of fan blades that extend from the hub, and the row includes a number (N) of the fan blades, the number (N) being 14, a solidity value (R) at tips of the fan blades that is from 1.0 to 1.2, and a ratio of N/R that is from 11.7 to 14.0.

20. The gas turbine engine as recited in claim 19, further comprising a second turbine coupled with the second shaft, wherein the second turbine is a 2-stage turbine.

21. The gas turbine engine as recited in claim 19, wherein the bypass flow passage includes an outlet, the inlet and the outlet defining a design pressure ratio with regard to an inlet pressure at the inlet and an outlet pressure at the outlet at a design rotational speed of the engine, the design pressure ratio being approximately 1.3 to 1.55.

22. The gas turbine engine as recited in claim 21, further comprising a second turbine coupled with the second shaft, wherein the second turbine is a 2-stage turbine.

23. The gas turbine engine as recited in claim 22, wherein the ratio of N/R is from 12.7 to 14.0.

24. The gas turbine engine as recited in claim 19, wherein the ratio of N/R is from 12.7 to 14.0.

25. The gas turbine engine as recited in claim 24, further comprising a second turbine coupled with the second shaft, wherein the second turbine is a 2-stage turbine.

26. The gas turbine engine as recited in claim 25, wherein the bypass flow passage includes an outlet, the inlet and the outlet defining a design pressure ratio with regard to an inlet pressure at the inlet and an outlet pressure at the outlet at a design rotational speed of the engine, the design pressure ratio being between 1.3 and 1.4.

27. A gas turbine engine comprising:
a bypass flow passage and a core flow passage, the bypass flow passage including an inlet and an outlet which define a design pressure ratio with regard to an inlet pressure at the inlet and an outlet pressure at the outlet at a design rotational speed of the engine, the design pressure ratio being between 1.3 and 1.4;
a fan arranged within the bypass flow passage;
a first shaft and a second shaft;
a first turbine coupled with the first, the first shaft coupled with the fan; and
a second turbine coupled with a second shaft;
wherein the fan includes a hub and a row of fan blades that extend from the hub, and the row includes a number (N) of the fan blades that is from 12 to 16, a solidity value (R) at tips of the fan blades that is from 1.0 to 1.2, and a ratio of N/R that is from 10.0 to 16.0.

28. The gas turbine engine as recited in claim 27, further comprising a gear assembly, wherein the first turbine is coupled with the fan through the first shaft and gear assembly, and further comprising a variable area nozzle, wherein the design pressure ratio is achieved in operation with the visible area nozzle fully open.

* * * * *